United States Patent
Lee et al.

(10) Patent No.: US 8,513,870 B2
(45) Date of Patent: Aug. 20, 2013

(54) ELECTRON EMISSION SOURCE, ELECTRIC DEVICE USING THE SAME, AND METHOD OF MANUFACTURING THE ELECTRON EMISSION SOURCE

(75) Inventors: Cheol Jin Lee, Seoul (KR); Seung Il Jung, Seoul (KR)

(73) Assignee: Korea University Industrial & Academic Cooperation Foundation, Seoul (KR)

( * ) Notice: Subject to any disclaimer, the term of this patent is extended or adjusted under 35 U.S.C. 154(b) by 286 days.

(21) Appl. No.: 12/129,005

(22) Filed: May 29, 2008

(65) Prior Publication Data
US 2009/0218930 A1  Sep. 3, 2009

(30) Foreign Application Priority Data
Feb. 29, 2008 (KR) .................. 10-2008-0019298

(51) Int. Cl.
*H01J 1/304* (2006.01)

(52) U.S. Cl.
USPC .......................................... 313/496; 313/293

(58) Field of Classification Search
USPC .......................................... 313/496, 293–304
See application file for complete search history.

(56) References Cited

U.S. PATENT DOCUMENTS

| | | | |
|---|---|---|---|
| 6,277,318 B1 | 8/2001 | Bower et al. | |
| 6,350,488 B1 | 2/2002 | Lee et al. | |
| 6,514,113 B1 | 2/2003 | Lee et al. | |
| 6,590,322 B2* | 7/2003 | Hsu ............... | 313/310 |
| 6,616,497 B1 | 9/2003 | Choi et al. | |
| 6,969,690 B2 | 11/2005 | Zhou et al. | |
| 2002/0104603 A1* | 8/2002 | Chang et al. ......... | 156/89.12 |
| 2002/0125806 A1 | 9/2002 | Sugimura et al. | |
| 2003/0027478 A1 | 2/2003 | Park et al. | |
| 2004/0166235 A1* | 8/2004 | Fujii et al. .............. | 427/77 |
| 2004/0189183 A1* | 9/2004 | Hu et al. ................. | 313/497 |
| 2005/0062195 A1 | 3/2005 | Chao et al. | |
| 2005/0156504 A1 | 7/2005 | Takai et al. | |
| 2005/0202578 A1 | 9/2005 | Yaniv et al. | |
| 2006/0055303 A1 | 3/2006 | Liu et al. | |
| 2006/0175950 A1* | 8/2006 | Itou et al. .............. | 313/311 |
| 2007/0103048 A1* | 5/2007 | Liu et al. .............. | 313/311 |

FOREIGN PATENT DOCUMENTS

| | | |
|---|---|---|
| EP | 1 361 592 A1 | 11/2003 |
| EP | 1 553 613 A2 | 7/2005 |
| JP | 2003523603 | 8/2003 |
| JP | 2004095310 | 3/2004 |
| KR | 1998-0018330 | 6/1998 |

(Continued)

OTHER PUBLICATIONS

Office Action in KR 10-2008-0019298 dated Mar. 16, 2009.

(Continued)

*Primary Examiner* — Anne Hines
*Assistant Examiner* — Jacob R Stern
(74) *Attorney, Agent, or Firm* — Buchanan Ingersoll & Rooney PC

(57) ABSTRACT

Provided are an electron emission source, a display apparatus using the same, an electronic device, and a method of manufacturing the display apparatus. The electron emission source includes a substrate, a cathode separately manufactured from the substrate, and a needle-shaped electron emission material layer, e.g., carbon nanotube (CNT) layer, fixed to the cathode by an adhesive layer. The CNT layer is formed by a suspension filtering method, and electron emission density is increased by a subsequent taping process on the electron emission material layer.

9 Claims, 16 Drawing Sheets

(56) References Cited

FOREIGN PATENT DOCUMENTS

| KR | 2003-0012971 | 2/2003 |
| KR | 2003-0025639 | 3/2003 |
| KR | 2006-0064604 | 6/2006 |
| KR | 1020060093794 A | 8/2006 |
| KR | 1020070001769 | 1/2007 |
| KR | 1020070011808 | 1/2007 |
| KR | 1020070104024 A | 10/2007 |
| WO | 0161719 A1 | 8/2001 |
| WO | WO 2004/001795 A2 | 12/2003 |
| WO | WO 2006/099156 A2 | 9/2006 |
| WO | 2007013871 A2 | 2/2007 |

OTHER PUBLICATIONS

Bonard et al., "Field Emission from Single-Wall Carbon Nanotube Films" Applied Physics Letters, 1998, vol. 73, No. 7, pp. 918-920.

Bower et al., "Fabrication and Field Emission Properties of Carbon Nanotube Cathodes" Mat. Res. Soc. Symp. Proc. 2000, vol. 593, pp. 215-220.

Choi et al., "Fully Sealed, High-Brightness Carbon-Nanotube Field-Emission Display" Applied Physics Letters, 1999, vol. 75, No. 20, pp. 3129-3131.

De Heer et al., "Aligned Carbon Nanotube Films: Production and Optical and Electronic Properties" Science, 1995, vol. 268, No. 5212, pp. 845-847.

Fan et al., "Self-Oriented Regular Arrays of Carbon Nanotubes and Their Field Emission Properties" Science, 1999, vol. 283, pp. 512-514.

Gao et al., "Fabrication and Electron Field Emission Properties of Carbon Nanotube Films by Electrophoretic Deposition" Advanced Materials, 2001, vol. 13, No. 23, pp. 1770-1773.

Jeong et al., Fabrication of Efficient Field Emitters with Thin Multiwalled Carbon Nanotubes Using Spray Method, Carbon, 2006, vol. 44, pp. 2689-2693.

Jung et al., "Improved Crystallinity of Double-Walled Carbon Nanotubes After a High-Temperature Thermal Annealing and Their Enhanced Field Emission Properties" J. Phys. Chem. C, 2007, vol. 111, No. 11, pp. 4175-4179.

Jung et al., "Clean Carbon Nanotube Field Emitters Aligned Horizontally" Nano Letters, 2006, vol. 6, No. 7, pp. 1569-1573.

Kordás et al., "Inkjet Printing of Electrically Conductive Patterns of Carbon Nanotubes" Small, 2006, vol. 2, No. 8-9, pp. 1021-1025.

Lee et al., "Synthesis of Aligned Carbon Nanotubes Using Thermal Chemical Vapor Deposition" Chemical Physics Letters, 1999, vol. 312, pp. 461-468.

Lee et al., "Growth and Field Electron Emission of Vertically Aligned Multiwalled Carbon Nanotubes" Chemical Physics Letters, 2000, vol. 326, pp. 175-180.

Minoux et al., "Achieving High-Current Carbon Nanotube Emitters" Nano Letters, 2005, vol. 5, No. 11, pp. 2135-2138.

Shimoda et al., "Self-Assembly of Carbon Nanotubes" Advanced Materials, 2002, vol. 14, No. 12, pp. 899-901.

Wei et al., "Preparation of a Carbon Nanotube Film by Ink-Jet Printing" Letters to the Editor / Carbon, 2007, vol. 45, pp. 2692-2716.

EP Search Report EP 08 15 7123 dated May 27, 2009.

Korean Office Action issued on Sep. 23, 2009.

\* cited by examiner (a)

(b)

ELECTRON EMISSION SOURCE, ELECTRIC DEVICE USING THE SAME, AND METHOD OF MANUFACTURING THE ELECTRON EMISSION SOURCE

CROSS-REFERENCE TO RELATED PATENT APPLICATION

This application claims the benefit of Korean Patent Application No. 10-2008-0019298, filed on Feb. 29, 2008, in the Korean Intellectual Property Office, the disclosure of which is incorporated herein in its entirety by reference.

BACKGROUND OF THE INVENTION

1. Field of the Invention

The present invention relates to an electron emission source, an electric device using the same, and a method of manufacturing the electron emission source, and more particularly, to an electron emission source using a needle-shaped electron emission material such as carbon nanotubes (CNT).

2. Description of the Related Art

Carbon nanotubes (CNTs) or nanoparticles are preferred as electron emission materials of electron emission sources. CNTs refer to tubular molecules composed primarily of carbons. There are various types of CNTs according to shapes. CNTs have very good electrical, mechanical, chemical, and thermal properties, and thus are applied to various fields. CNTs have a low work function and a high aspect ratio. Since the radius of curvature at a top end or emission end is small, CNTs have a very high field enhancement factor, thereby making it possible to emit electrons at a low electric field.

Conventional methods of manufacturing a CNT electron emission source are roughly divided into a method of vertically growing CNTs directly on a conductor, such as a cathode or a substrate, and a method of attaching CNT powder, which is separately synthesized, to a cathode.

Examples of the method of vertically growing the CNTs directly on the conductor includes a lot of methods that involve vertically aligning CNTs on various cathode substrates, on which catalytic metal particles are deposited, through decomposition of carbon source gas at high temperature (refer to Science vol. 283, 512, 1999; Chemical Physics Letters. 312, 461, 1999; Chemical Physics Letters. 326, 175, 2000; Nano Letter vol. 5, 2153, 2005; US006350488B1; and US006514113B1).

Examples of the method of attaching the synthesized CNT powder to the cathode include suspension filtering, screen printing, electrophoresis, self-assembly, spraying, and inkjet printing.

A suspension filtering method involves filtering a CNT suspension through filter paper having pores and transferring the filtered CNT suspension to a cathode substrate coated with Teflon (refer to Science vol. 268, 845, 1995, and Applied Physics Letters vol. 73, 918, 1998).

A screen printing involves printing and firing paste, which is formed by mixing CNT powder with a vehicle containing a polymer and an organic solvent, an inorganic binder, and other additives, on a cathode substrate to form a CNT thin film (refer to Applied Physics Letters vol. 75, 3129, 1999, and Korean Patent Publication No. 10-2007-0011808).

An electrophoresis method involves loading a cathode substrate in an electrolyte solution containing a surfactant and CNT powder and attaching CNT particles to the cathode substrate by using electrophoresis (refer to Advanced Materials vol. 13, 1770, 2001; Nano Letter vol. 6, 1569, 2006; US006616497B1; and US200600555303A1.

A self-assembly method involves vertically dipping a hydrophilic substrate in a suspension where CNTs whose surfaces are modified to hydrophilic are dispersed in deionized water to form a CNT thin film through slow evaporation (refer to Advanced Materials vol. 14, 8990, 2002; and US006969690B2).

A spraying method involves spraying an evenly dispersed CNT suspension through a spray nozzle to form a CNT thin film on a cathode substrate (refer to Mat. Res. Soc. Symp. Proc. vol. 593, 215, 2000; Carbon vol. 44, 2689, 2006; the Journal of Physical Chemistry C. 111, 4175, 2007; US006277318B1; and Korean Patent Publication No. 10-2007-0001769).

An inkjet printing method involves printing an evenly dispersed CNT suspension on a cathode substrate by using an inkjet printer to form a CNT thin film (refer to Small. vol. 2, 1021, 2006; Carbon vol. 45, 27129, 2007; and US20050202578A1).

In detail, a method of directly vertically growing CNTs comprises depositing a nano-sized catalytic metal on a conductive or non-conductive cathode substrate through sputtering, thermal deposition, electron (E)-beam evaporation, or the like, thermally decomposing carbon source gas, that is, a gaseous or liquid hydrocarbon, at high temperature through chemical vapor deposition (CVD), and manufacturing an vertically aligned CNT field electron emission source. This method has advantages in that it is easy to control the diameter, length, density, and pattern of the CNTs, but has disadvantages in that it is difficult to ensure high uniformity and control the particle size of the catalytic metal when the catalytic metal is deposited over a large area, adhesion between the grown CNTs and the cathode substrate is weak, and it is not easy to manufacture a large CNT field electron emission source.

In order to solve the weak adhesion between the CNTs and the cathode substrate and the difficulty in manufacturing the large CNT field electron emission source, various methods of purifying, dispersing, and functionalizing synthesized CNT power into paste or dispersing synthesized CNT in a solvent and a surfactant to form a suspension and attaching CNTs to a cathode substrate have been developed. Among the various methods, a screen printing method of printing CNT paste, which includes CNT powder, a polymer, a binder, an organic solvent, a metal filler, and other additives, on a cathode substrate and manufacturing a CNT electron emission source through drying, exposure, firing, surface protrusion process, and so on has advantages in that adhesion between the cathode substrate and the CNT electron emission source is strong and a large CNT electron emission source can be manufactured, but has disadvantages in that it is difficult to control the density of an active electron emission site, field electron emission characteristics are easily deteriorated due to the variety of organic and inorganic binders and polymers, and a manufacturing process is complicated. An electrophoresis method of mixing CNT powder with a dispersing agent in an electrolyte solution to form an evenly dispersed CNT suspension, loading two electrode substrates in the CNT suspension to form an electric field, depositing CNTs positively charged in the electric field on a cathode substrate to which a negative voltage is applied to manufacture a CNT field electron emission source has advantages in that selective deposition can be made at room temperature and a large CNT field electron emission source can be manufactured, but has disadvantages in that it is difficult to control thickness and density, uniformity and reproduction are poor, and adhesion between the CNTs and the cathode substrate is weak, thereby reducing reliability and stability during field electron emission.

A self-assembly method of vertically dipping a hydrophilic cathode substrate in a suspension where CNTs whose surfaces are modified to hydrophilic are dispersed in deionized water to form a CNT field electron emission source through slow evaporation has advantages in that a manufacturing process is simple and the CNT field electron emission source can be easily made large at room temperature, but has disadvantages in that adhesion between a CNT thin film and the cathode substrate is weak, like the electrophoresis method, and lots of time is required.

A spraying method has advantages in that a manufacturing process is simple and a large CNT field electron emission source can be easily manufactured at room temperature, but has disadvantages in that, since the state of a surface of a CNT thin film is determined by the amount of suspension that evaporates while the suspension is sprayed from a nozzle to a cathode substrate, it is difficult to control the thickness and density of the CNT thin film, it is also difficult to uniformly deposit the CNT thin film, which results in low uniformity and reproduction, and adhesion between the CNT thin film and the cathode substrate is weak, which leads to easy detachment during electric field electron emission.

An inkjet printing method of selectively printing a suspension, which is formed by evenly dispersing CNT powder whose surface is modified to hydrophilic in deionized water, on a cathode substrate to form a CNT field electron emission source had advantages in that it is easy to control the thickness and density of a CNT thin film, and the CNT thin film can be selectively patterned and can be made large at room temperature, but has disadvantages in that adhesion between the printed CNT field electron emission source and the cathode substrate is weak. A suspension filtering method of filtering an evenly dispersed CNT suspension through filter paper having pores, and simply transferring the filtered CNT suspension to a cathode surface coated with Teflon to form a CNT field electron emission source has advantages in that it is easy to control the thickness and density of a CNT thin film by controlling the amount or density of CNT powder, a manufacturing process is simple, and a large CNT field electron emission source can be manufactured, but has disadvantages in that adhesion between the CNT thin film and the cathode substrate is weak.

As a modification of the suspension filtering method of forming the CNT thin film and then transferring the CNT thin film to the cathode substrate, a method of bonding a CNT thin film, which is directly grown and vertically aligned, to a layer where conductive silver paste is patterned, thermally compressing the CNT thin film, and transferring the resultant CNT thin film to a metal substrate, or preparing a patterned conductive layer on a glass sheet, depositing conductive carbon paste, such as, silver or gold paste, on the conductive layer, and transferring CNTs, which are moved from a CNT thin film, which is directly grown and vertically aligned, to an adhesion sheet, to the conductive paste deposited on the conductive layer to form a CNT field electron emission source is disclosed in US 2004/0166235A1. However, this method has disadvantages in that it is difficult to manufacture a large CNT thin film because the CNT thin film is directly grown and vertically aligned, and a manufacturing process is complicated because drying, compression, and heating, or thermal compression, should be performed to ensure high adhesion when the CNTs are transferred.

In manufacturing a good CNT electron emission source, high reliability, high stability, and low cost should be ensured. Impurities badly affecting electron emission should not be mixed. The density of CNTs should be easily controlled for high uniformity and reproduction. Adhesion between the CNTs and a cathode supporting the CNTs should be high enough to ensure reliability and stability of the CNT electron emission source. Also, a manufacturing processes should be simple to reduce manufacturing costs and a large CNT electron emission source should be able to be manufactured.

SUMMARY OF THE INVENTION

The present invention provides an electron emission source with high reliability that can be easily manufactured, a display apparatus using the electron emission source, and methods of manufacturing the electron emission source and the display apparatus.

According to an aspect of the present invention, there is provided an electron emission source comprising: a conductive plate-shaped cathode; a needle-shaped electron emission material layer formed on a surface of the cathode; a base supporting the cathode; and a fixing element fixing the cathode to the base.

An adhesive layer for fixing the electron emission material layer to a conductive tape may be interposed between the electron emission material layer and the conductive tape.

The fixing element may be any one of a fixing member, an adhesive, and a welding portion which mechanically fix the conductive tape to the base.

The base supporting the cathode and the fixing member fixing the cathode to the base may be complementarily engaged with each other. A protrusion corresponding to the electron emission material layer may be formed on the base, and the fixing member has a frame shape and is fitted around the protrusion.

According to another aspect of the present invention, there is provided a method of manufacturing an electron emission source, the method comprising: forming an electron emission material layer on a template; transferring the electron emission material layer to a plate-shaped cathode on which an adhesive layer is formed and fixing the electron emission material layer to the cathode; and performing a taping process on the electron emission material layer transferred to the cathode to erect electron emission materials with respect to the cathode.

The plate-shaped template may be a filter template having a plurality of pores. The forming of the electron emission material layer may comprise: applying a suspension in which electron emission materials are dispersed onto the template; and drying the suspension.

The performing of the taping process may comprise pressing an erecting member having adhesion to the electron emission materials against the electron emission materials, and separating the erecting member from the electron emission materials, to erect the electron emission materials with respect to the cathode. The erecting member may be an adhesive tape or a roller.

The method may further comprise fixing the cathode to a cathode base. The fixing of the cathode may be performed between the transferring of the electron emission material layer and the performing of the taping process.

The suspension may include a solvent and a surfactant.

According to another aspect of the present invention, there is provided a display apparatus comprising: a cathode fixed to a top surface of a substrate; a plurality of electron emission material layers formed at predetermined intervals on a top surface of the cathode; an adhesive layer fixing the electron emission material layers to the cathode; a front plate spaced apart from the substrate; an anode formed on an inner surface of the front plate facing the electron emission material layers; a phosphor layer formed on a surface of the anode; a grid disposed between the cathode and the phosphor layer and extracting electrons from the electron emission material layers; and an insulating layer having through-holes corresponding to the electron emission material layers and formed on the cathode.

The cathode may be fixed to the substrate by an adhesive layer disposed under the cathode.

An adhesive layer for fixing the electron emission material layers to the cathode may be formed only under the electron emission material layers.

An adhesive layer for adhering the electron emission material layers and an adhesive layer for fixing the cathode to the substrate may be formed on both surfaces of the cathode.

BRIEF DESCRIPTION OF THE DRAWINGS

The above and other features and advantages of the present invention will become more apparent by describing in detail exemplary embodiments thereof with reference to the attached drawings in which:

FIG. 19B is a cross-sectional view illustrating a method of manufacturing a cathode of a display apparatus according to another embodiment of the present invention.

DETAILED DESCRIPTION OF THE INVENTION

Figure 1:
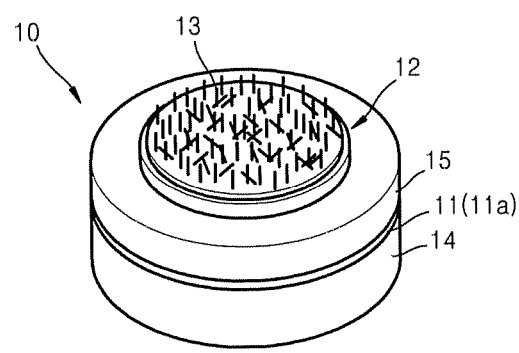
FIG. 1 is a perspective view of a unit electron emission source according to an embodiment of the present invention.

The invention is described more fully hereinafter with reference to the accompanying drawings, in which embodiments of the invention are shown. This should not be construed as limiting the claims to the embodiments shown. Rather, these embodiments are provided to convey the scope of the invention to those skilled in the art. In the drawings, the size and relative sizes of elements and regions may be exaggerated for clarity.

It will be understood that when an element or layer is referred to as being "on", "interposed", "disposed", or "between" another element or layer, it can be directly on, interposed, disposed, or between the other element or layer or intervening elements or layers can be present.

The terms "first," "second," and the like, "primary," "secondary," and the like, as used herein do not denote any order, quantity, or importance, but rather are used to distinguish one element, region, component, layer, or section from another. The terms "front", "back", "bottom", and/or "top" are used herein, unless otherwise noted, merely for convenience of description, and are not limited to any one position or spatial orientation.

The terms "a" and "an" do not denote a limitation of quantity, but rather denote the presence of at least one of the referenced item. The suffix "(s)" as used herein is intended to include both the singular and the plural of the term that it modifies, thereby comprising one or more of that term (e.g., the layer(s) includes one or more layers).

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The endpoints of all ranges directed to the same component or property are inclusive of the endpoint and independently combinable, e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc. The modifier "about" used in connection with a quantity is inclusive of the stated value and has the meaning dictated by the context (e.g., includes the degree of error associated with measurement of the particular quantity).

Unless defined otherwise, technical and scientific terms used herein have the same meaning as is commonly understood by one of skill in the art to which this invention belongs.

Figure 2:
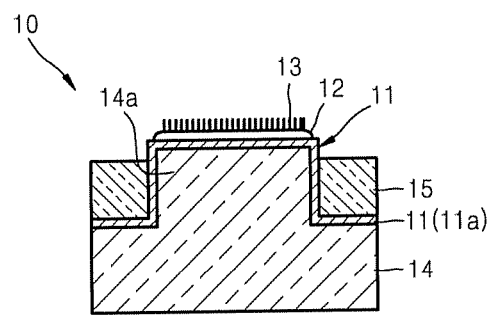
FIG. 2 is a cross-sectional view of the electron emission source of FIG. 1 according to an embodiment of the present invention.

FIG. 1 is a perspective view of a unit electron emission source 10 according to an embodiment of the present invention. FIG. 2 is a cross-sectional view of the electron emission source 10 of FIG. 1.

The electron emission source 10 uses needle-shaped electron emission materials. Examples of the needle-shaped electron emission materials include hollow nanotubes or filled nanorods, e.g., carbon nanotubes or carbon nanorods, or other metal materials. Carbon nanotubes (CNTs), which are representative needle-shaped electron emission materials, will be exemplarily explained. However, the present invention is not limited thereto and any needle-shaped materials capable of emitting electrons can be used.

Referring to FIGS. 1 and 2, the electron emission source 10 includes a plate-shaped cathode 11 to which a CNT layer 13 is fixed by an adhesive layer 12, and a cathode base 14 supporting the cathode 11. The cathode 11 includes a ring-shaped fixing member 15. The fixing member 15 is forcedly fitted around a protrusion 14a of the base 14 to fixedly compress a skirt portion 11a of the cathode 11. The plate-shaped cathode 11 is formed of a plate-shaped conductive material that is separately manufactured from the base 14. The adhesive layer 12 is formed on a surface of the cathode 11, such that CNTs of the CNT layer 13 having lower ends contacting the adhesive layer 12 are strongly attached to the cathode 11. The CNT layer 13 is formed from substantially pure CNTs, and thus has higher stability and reliability than a conventional CNT layer formed of CNT paste. Since the CNT layer 13 formed on the plate-shaped cathode 11 is fixed to the base 14 that is a support structure of the electron emission source 10, a manufacturing process is simple. Also, since a high temperature process is not required, there is no financial burden accompanying the high temperature process. In particular, since the adhesive layer 12 which may include organic matters is formed only under the CNTs, the risk of collisions between the organic matters and electrons is very low, and thus organic gas is hardly generated.

Figure 3:
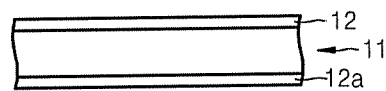
FIG. 3 is a cross-sectional view of a cathode of the electron emission source of FIG. 1 according to an embodiment of the present invention.

FIG. 3 is a cross-sectional view of the cathode 11 of the electron emission source 10 according to another embodiment of the present invention. Referring to FIG. 3, since another adhesive layer 12a is formed on a bottom surface of the plate-shaped cathode 11, the cathode 11 can be more securely fixed to the cathode base 14 due to the adhesive layer 12a. The adhesive layer 12 disposed between the cathode 11 and the CNT layer 13 and fixing the CNTs of the CNT layer 13 to the cathode 11 may be a material layer already formed on a surface of the plate-shaped cathode 11. That is, the plate-shaped cathode 11 may be manufactured to have both surfaces to which the adhesive layers 12 and 12a are applied and then may be used for the electron emission source 10. The upper adhesive layer 12 for fixing the CNTs to the cathode 11 may be formed only under the CNT layer 13, or alternatively, may be formed over an entire top surface of the cathode 11. The adhesive layer 12 is formed only under the CNT layer 13 in FIG. 1.

Figure 4:
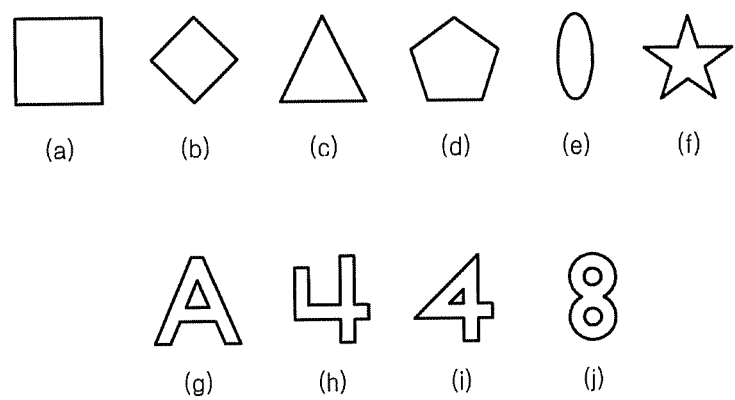
FIG. 4 illustrates various cathode bases supporting the cathode of the electron emission source of FIG. 1 according to embodiments of the present invention.

The fixing member 15 for fixing the cathode 11 to the cathode base 14 is optional. The base 14 and the fixing member 15 are complimentarily engaged with each other such that the cathode base 14 and the fixing member 15 can securely fix the cathode 11 between the cathode base 14 and the fixing member 15. FIG. 4 illustrates various cathode bases according to embodiments of the present invention. Referring to FIG. 4, the protrusion 14a may have a polygonal shape, such as a square, a diamond, a triangle, or a pentagon, an oval shape, or other various shapes such as a letter, a number, or a symbol. The fixing member 15 may have a conformal shape to engage with the protrusion 14a.

Figure 5A:
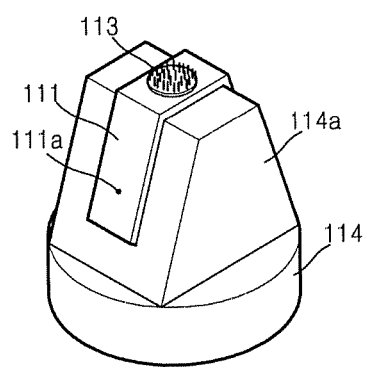
FIG. 5A is a perspective view of an electron emission source according to another embodiment of the present invention.
Figure 5B:
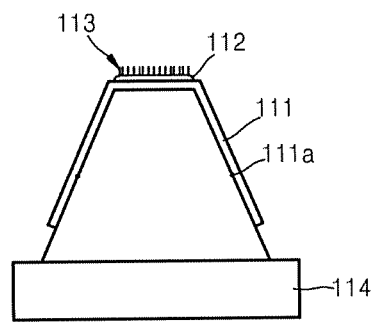
FIG. 5B is a side view of the electron emission source of FIG. 5A according to an embodiment of the present invention.

FIG. 5A is a perspective view of an electron emission source according to another embodiment of the present invention. FIG. 5B is a side view of the electron emission source of FIG. 5A according to an embodiment of the present invention. Referring to FIGS. 5A and 5B, without using the fixing member 15, a cathode 111 to which a CNT layer 113 is fixed by an adhesive layer 112 may be directly welded to a cathode base 114. The cathode 111 has a band shape, and the cathode base 114 includes a protrusion 114a having an angular side surface. The electron emission source is formed by first forming the CNT layer 113 on the cathode 111, pulling out both ends of the cathode 111 with an appropriate tensile force, and welding the cathode 111 to the protrusion 114a of the cathode base 114. In FIGS. 5A and 5B, reference numeral 111a denotes a welding point or a welding portion having a predetermined length. Without using the fixing member 15 shown in FIGS. 1 and 2, the cathode 111 of FIGS. 5A and 5B is directly fixed to the cathode base 114.

Figure 6A:
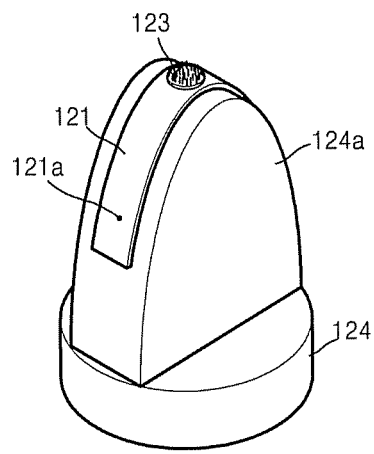
FIG. 6A is a perspective view of an electron emission source according to another embodiment of the present invention.
Figure 6B:
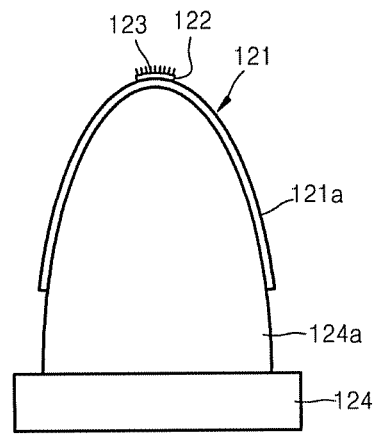
FIG. 6B is a side view of the electron emission source of FIG. 6A according to an embodiment of the present invention.
Figure 7A:
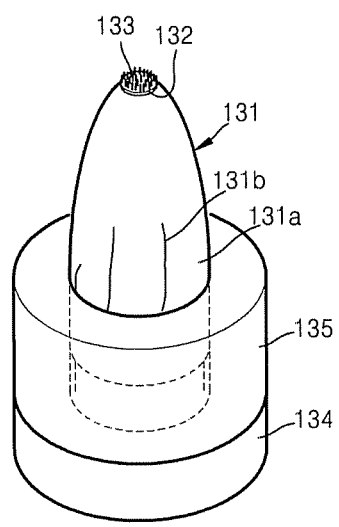
FIG. 7A is a perspective view of an electron emission source according to another embodiment of the present invention.
Figure 7B:
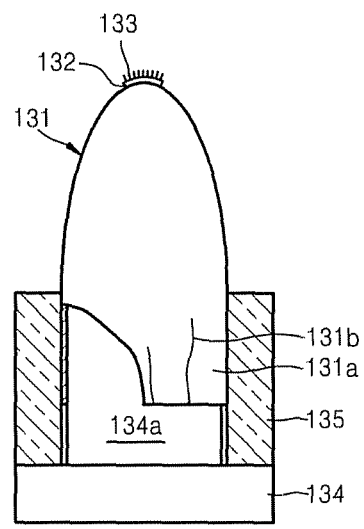
FIG. 7B is a side view of the electron emission source of FIG. 7A according to an embodiment of the present invention.

FIGS. 6A and 7A are perspective views of electron emission sources according to other embodiments of the present invention. FIGS. 6B and 7B are cross-sectional views of the electron emission sources of FIGS. 6A and 7A, respectively, according to embodiments of the present invention.

The electron emission source of FIGS. 6A and 6B is similar in structure to the electron emission source of FIGS. 5A and 5B. A protrusion 124a of a cathode base 124 has a curved side surface that is partially surrounded by a cathode 121. The cathode 121 has a band shape, and the cathode base 124 includes the protrusion 124a having the curved side surface. The electron emission source of FIGS. 6A and 6B is formed by fixing a CNT layer 123 to the cathode 121 by using an adhesive layer 122, pulling out both ends of the cathode 121 with an appropriate tensile force, and welding the cathode 121 to welding portions 121a that are formed at lower sides of the protrusion 124a of the cathode base 124.

Referring to FIGS. 7A and 7B, a cylindrical protrusion 134a of a cathode base 134 has a curved side surface. A CNT layer 133 is located on a cathode 131 corresponding to the protrusion 134a. The CNT layer 133 is fixed to the cathode 131 by using an adhesive layer 132.

A lower skirt portion 131a of the cathode 131 is strongly pressed to the protrusion 134a by a fixing member 135. The cathode 131 may be formed of a flexible material, such as aluminum, so that the cathode 131 can be closely attached to the protrusion 134a having the curved side surface. The cathode may have a wrinkle portion 131b in the lower skirt portion 131a.

Figure 8:
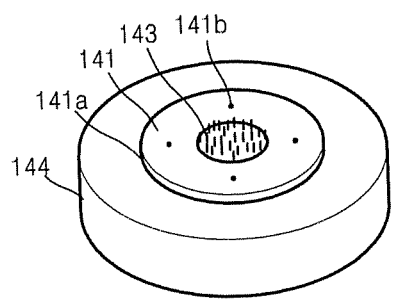
FIG. 8 is a perspective view of an electron emission source according to another embodiment of the present invention.

FIG. 8 is a perspective view of an electron emission source according to another embodiment of the present invention. A cathode 141 is welded to a plate-shaped cathode base 144. In detail, the cathode 141 has a disk shape, and a CNT layer 143 is formed on a central portion of the cathode 141. A skirt portion 141a of the cathode 141 is welded to a top surface of the cathode base 144. In FIG. 8, reference numeral 141b denotes a welding portion.

In the aforementioned embodiments, although the cathodes 111 and 141 are respectively welded to the cathode bases 114 and 144, adhesive layers may be formed under the cathodes 111 and 141 so that the cathodes 114 and 141 can be more securely and stably fixed to the cathode bases 114 and 144.

The unit electron emission sources may be applied to electronic devices in various fields. Examples of the electron devices include a visible light source used for illumination, a backlight unit for a flat panel display (FPD), an electronic source for an X-ray device, and an electronic device for high power microwaves.

In the above embodiments, the cathodes 11, 111, 121, 131, and 141 are conductors having properly adjusted electrical resistances, such that current is uniformly supplied to the CNT layers 13, 113, 123, 133, and 143 fixed to the surfaces of the cathodes 11, 111, 121, 131, and 141 and the CNT layers 13, 113, 123, 133, and 143 can uniformly emit electrons.

FIGS. 9A through 9F are cross-sectional views illustrating a method of manufacturing a unit electron emission source according to an embodiment of the present invention.

First, a CNT colloidal suspension (referred to as a suspension), and a filter template formed of Teflon, ceramic, anodic aluminum oxide (AAO), or polycarbonate are prepared. The suspension is a colloidal solution formed by dispersing CNT powder in a solvent and a surfactant. For more even dispersion, ultrasonic treatment may be performed. The suspension is filtered through the filter template and only CNTs are left behind on a surface of the filter template. The suspension is dried, and only the left CNTs are patterned and transferred to a plate-shaped cathode. The CNTs may be single-walled (SW) CNTs, double-walled (DW) CNTs, thin multi-walled (MW) CNTs, or thick MWCNTs. The solvent is any one selected from the group consisting of ethanol, dimethyl formamide, tetrahydrofuran, dimethyl acetamide, 1,2 dichloroethane, and 1,2 dichlorobenzene.

The surfactant is any one selected from the group consisting of sodium dodecylbenzene sulfonate(NaDDBS $C_{12}H_{25}C_6H_4SO_3Na$), sodium butylbenzene sulfonate (NaBBS $C_4H_9C_6H_4SO_3Na$), sodium benzoate ($C_6H_5CO_2Na$), sodium dodecyl sulfate (SDS; $CH_3(CH_2)_{11}OSO_3Na$), Triton X-100 (TX100; $C_8H_{17}C_6H_4(OCH_2CH_2)n$-OH; n 10), dodecyltrimethylammonium bromide (DTAB; $CH_3(CH_2)_{11}N(CH_3)_3Br$), and arabic gum.

Figure 9A:
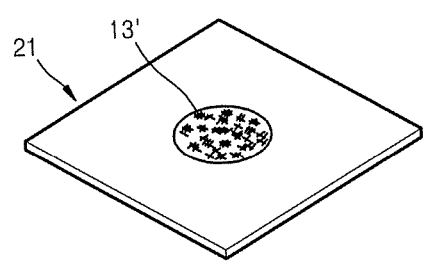
FIGS. 9A through 9F are cross-sectional views illustrating a method of manufacturing an electron emission source according to an embodiment of the present invention.

Referring to FIG. 9A, a suspension is filtered through a filter template 21, patterned into a predetermined shape, and dried to form a CNT layer 13'. The predetermined shape corresponds to the shape of a cathode 11 of the electron emission source, for example, any one of the various shapes shown in FIG. 4. The predetermined shape varies depending on the shape of the cathode 11. Here, by controlling a solvent and a surfactant of the suspension and the concentration of CNTs, CNT density can be freely controlled and optimal electron emission under various surrounding electrical conditions can be obtained, and thus a CNT layer with good reproduction, high uniformity, and optimal density can be formed. The suspension is applied to the filter template 21, only the CNTs are left behind, and a liquid material is passed through the filter template 21. When a drying process is performed in this state, the CNT layer 13' is formed on the surface of the filter template 21. Air drying or vacuum drying may be performed at room temperature or at high temperature.

Figure 9B:
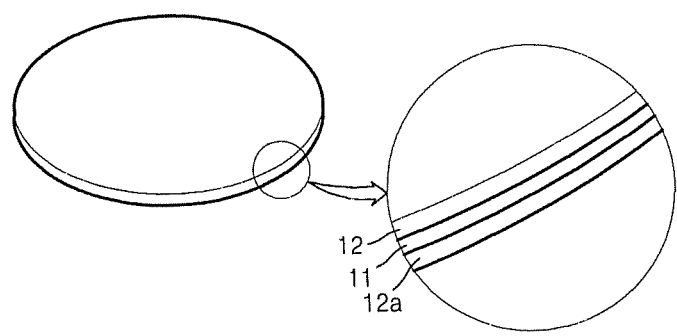

Referring to FIG. 9B, the cathode 11 having both surfaces on which upper and lower adhesive layers 12 and 12a are disposed is prepared. The lower adhesive layer 12a is protected by release paper (not shown) for preventing foreign particles from sticking to the lower adhesive layer 12a. The cathode 11 is formed of a conductive material such as a conductive fabric or a metal plate. The upper and lower adhesive layers 12 and 12a may be formed of a conductive material such as a mixture of modified nickel and a polymer resin. In detail, the cathode 11 is formed of an aluminum foil having a thickness of 0.01 to 0.04 mm, or a conductive sheet including copper or nickel and having a thickness of 0.01 to 0.04 mm, or a conductive fabric having a thickness of 0.01 to 0.20 mm. That is, the cathode 11 may be formed of any one of a conductive fabric and a conductive sheet including any one of aluminum, copper, and nickel.

Each of the upper and lower adhesive layers 12 and 12a is formed of a mixture of conductive powder, such as nickel or carbon black, and an adhesive resin, such as acrylic ester polyol copolymer. Each of the upper and lower adhesive layers 12 and 12a is a conductive tape having a contact resistance of less than 0.1 $\Omega/25$ mm$^2$ and an allowable temperature of $-30°$ C. to $105°$ C.

Figure 9C:
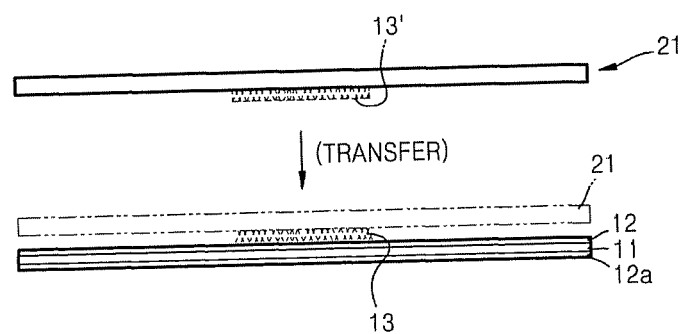

Referring to FIG. 9C, the CNT layer 13' on the filter template 21 is brought into contact with the upper adhesive layer 12 of the cathode 11 at a predetermined pressure, and then the filter template 21 is separated from the CNT layer 13' to form a CNT layer 13 for electron emission on the cathode 11.

Figure 9D:
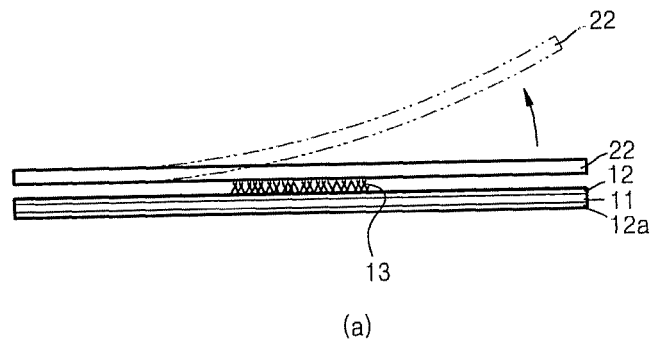
Figure 9D:
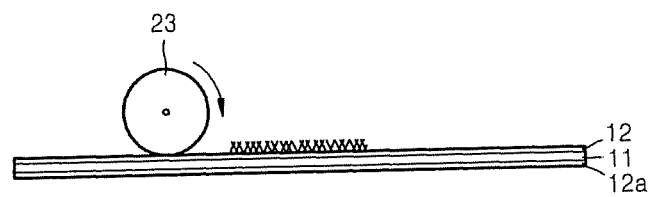

FIG. 9D illustrates that the CNT layer 13 is subjected to a taping process such that CNTs of the CNT layer 13 which are randomly arranged on the cathode 11 are vertically aligned. Referring to FIG. 9D-(a), an adhesive tape 22 is adhered to the CNT layer 13 on the cathode 11, and then is pulled up to strip off from the CNT layer 13. As such, exposed CNTs on a surface of the CNT layer 13 are vertically erected to the cathode 11 due to the adhesive tape 22. That is, the CNTs are erected in a direction perpendicular to the cathode 11 by means of the tape 22. Instead of the tape 22, an adhesive roller 23 may be used as shown in FIG. 9D-(b). Referring to FIG. 9D-(b), the adhesive roller 23 is rolled over the surface of the CNT layer 13 at a predetermined pressure, such that the CNTs are vertically erected to the cathode 11. During the taping process, some of the CNTs weakly fixed to the upper adhesive layer 12 of the cathode 11 may be separated and removed from the cathode 11. However, since most of the CNTs are strongly fixed to the cathode 11, the CNTs are vertically erected.

Figure 9E:
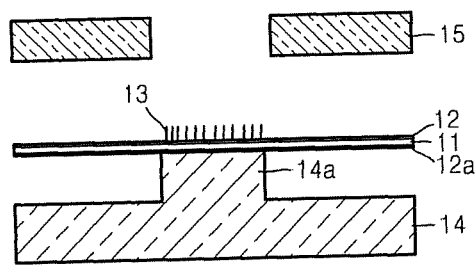

FIG. 9E illustrates that the cathode 11 is coupled to a cathode base 14. Referring to FIG. 9E, the cathode base 14 having a protrusion 14a is prepared, and then the cathode 11 is mounted on the cathode base 14. The CNT layer 13 formed on the cathode 11 is located to correspond to a top surface of the protrusion 14a. In this state, a fixing member 15 having a coupling hole 15a corresponding to the protrusion 14a is prepared. For clarity, the thicknesses of the cathode 11 and the upper and lower adhesive layers 12 and 12a of FIGS. 9C through 9E are exaggerated.

Figure 9F:
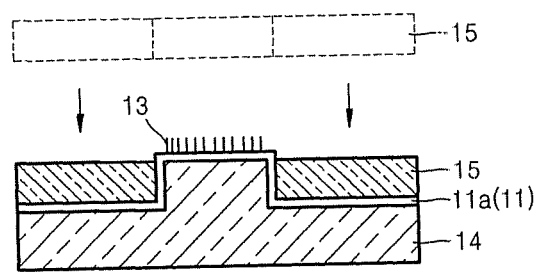

Referring to FIG. 9F, the fixing member 15 is fitted around the protrusion 14a, to fix the cathode 11 to the cathode base 14. The fixing member 15 fixes a skirt portion 11a of the cathode 11 around the protrusion 14a, thereby obtaining a desired single electron emission source 10. The upper and lower adhesive layers 12 and 12a formed on both the surfaces of the cathode 11 are not shown in FIG. 9F.

The method of FIGS. 9A through 9F may be modified in various ways. For example, the taping process for vertically erecting the CNTs of the CNT layer 13 may be performed in the state where the cathode 11 is fixed to the cathode base 14. That is, after the operations of 9C, 9E, and 9F are performed, the taping process of FIG. 9D-(a) using the adhesive tape 22 or of FIG. 9D-(b) using the adhesive roller 23 may be performed. However, the present invention is not limited to the taping process of FIG. 9D, and various modifications can be made without departing from the scope of the present invention.

The electron emission source according to the present invention is characterized in that after a CNT layer is fixed to a surface of a cathode, which is a plate-shaped conductor, by an adhesive layer, the cathode is fixed to a cathode base. That is, unlike a conventional electron emission source in which a cathode is fixed to a substrate and then CNTs are grown or fixed to the cathode, the electron emission source according to the present invention is characterized in that that a CNT layer is formed on a plate-shaped cathode and then the cathode is coupled to a substrate or a cathode base supporting the cathode. Each of the cathode bases in the above embodiments may correspond to the substrate of the conventional electron emission source. Unlike the conventional electron emission source in which the CNTs and paste are mixed, the electron emission source according to the present invention is also characterized in that an adhesive layer is disposed only under CNTs and the CNTs are fixed to the cathode due to the adhesive layer.

A method of manufacturing the electron emission sources shown in FIGS. 5A, 5B, 6A, and 6B would have been easily derived from the method of FIGS. 9A through 9F.

Figure 10A:
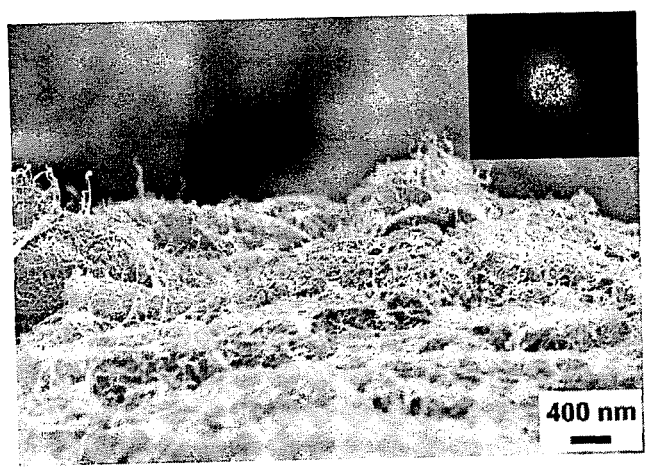
FIGS. 10A and 10B are scanning electron microscopy (SEM) images of a carbon nanotube (CNT) layer before and after the CNT layer is subjected to a taping process.
Figure 10B:
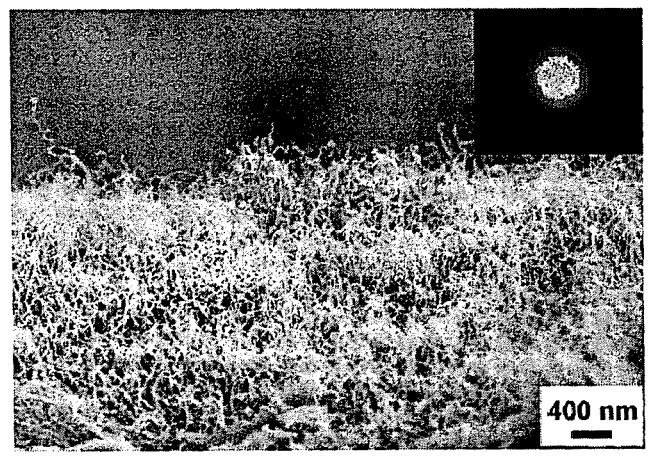

FIGS. 10A and 10B are scanning electron microscopy (SEM) images and emission patterns of a CNT layer before and after the CNT layer is subjected to a taping process. Referring to FIG. 10A, most of CNTs are tangled and lie down like a net and some of the CNTs are sparsely standing. In order to test electric field electron emission uniformity, a field emission pattern test was performed on a structure including an anode, which was formed by applying a phosphor to a transparent glass coated with indium tin oxide (ITO), and a cathode using a CNT layer that was not subjected to a taping process. A distance between the anode and the cathode was 400 μm. Referring to the emission pattern image shown at an upper right corner of FIG. 10A, partial emission, not a complete emission, is observed. This is because most of the CNTs lie down and the number of CNTs contributing to field electron emission is low. However, referring to FIG. 10B, since the taping process is performed, CNTs are vertically erected to uniform heights. Referring to the emission pattern image at an upper right corner of FIG. 10B, complete emission, not partial emission, is observed. This is because most of the CNTs are vertically erected, and when an electric field is applied, the electric field concentrates on tips of the vertically erected CNTs, thereby resulting in easy field electron emission and uniform electron emission.

Figure 11:
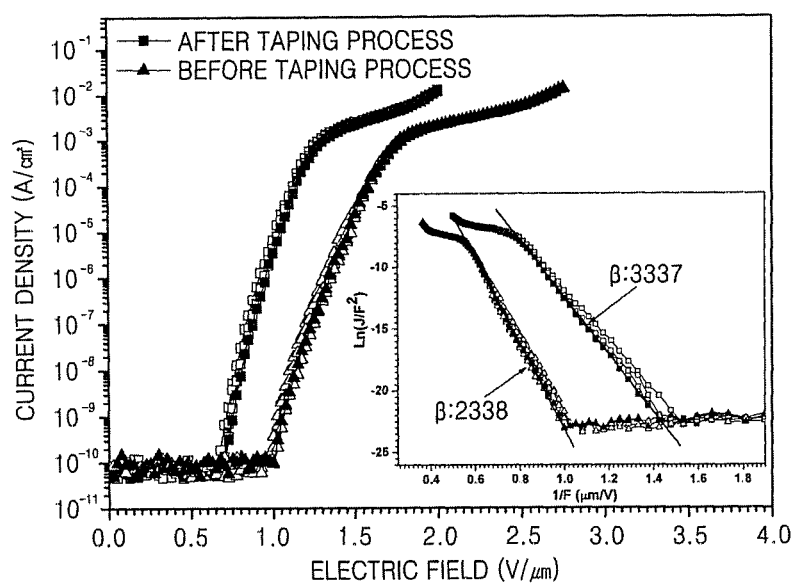
FIG. 11 is a graph illustrating a relationship between electric field and current density before and after a CNT layer of a CNT field electron emission source is subjected to a taping process.

FIG. 11 is a graph illustrating a relationship between current density J (A/cm$^2$) and electric field F (V/μm) before and after a CNT layer of a CNT electron emission source is subjected to a taping process. A field electron emission test was performed on a structure including an anode, which was a stainless steel plate, and a cathode, which was a CNT field electron emission source. A distance between the anode and the cathode was 400 μm, and an electron emission area was 0.19625 cm$^2$. A vacuum level was $2 \times 10^{-7}$ torr, and an applied voltage ranged from 0 V to 3500 V. CNT powder used for the CNT electric field emission source was a thin-MWCNT having an average diameter of approximately 7 nm. A CNT colloidal suspension was at a concentration of 20 mg/l. A turn-on electric field necessary to obtain a current density of 0.1 μA/cm$^2$ before and after a taping process was 1.24 V/μm and 0.88 V/μm, and an electric field necessary to obtain a maximum current density of 10 mA/cm$^2$ before and after a taping process was 2.70 V/μm and 1.98 V/μm.

It can be seen that higher electric field electron emission characteristics at a low electric field can be obtained after the taping process than before the taping process. Also, it can be seen that since adhesion between the cathode formed of a conductive tape and the CNT layer is high after the taping process, stable electric field electron emission can be achieved even at a high electric field. A graph embedded in FIG. 11 is a Fowler-Nordheim plot illustrating a relationship between current density and electric field before and after of a CNT layer of a CNT field electron emission source is subjected to a taping process using an adhesive tape. Electric emission generally obeys the Fowler-Nordheim equation, and current density J is given by $J = a(E_{loc}^2/\phi) \exp(-b\phi^{3/2}/E_{loc})$ where a and b are constants, $\phi$ is a work function (ev), $E_{loc}$ is an electric field applied to a tip of the CNT field electron emission source and satisfies $E_{loc} = \beta F$ ($\beta$: field enhancement factor), and F=V/d (V: a voltage between the anode and the cathode, and d: a distance between the anode and the cathode). Accordingly, in order to obtain a high current density J, the electric field $E_{loc}$ applied to the tip of the CNT field electron emission source must be maximized and the work function $\phi$ must be minimized. However, when the electric field $E_{loc}$ applied to the tip of the CNT field electron emission source is high, the tip of the CNT field electron emission source may be deteriorated and deformed and electric field emission characteristics may be deteriorated, thereby lowering efficiency. It is most effective to change the shape of the CNT electron emission source. The field enhancement factor $\beta$, which is related to the shape of the CNT electron emission source, is a proportional constant for the electric field $E_{loc}$ applied to the tip of the CNT field electron emission source and the electric field F applied between the anode and the cathode. Since the field enhancement factor $\beta$ is related to the shape of the CNT field electron emission source, the field enhancement factor $\beta$ increases as an aspect ratio increases. Accordingly, although the electric field F applied between the anode and the cathode is the same, the electric field $E_{loc}$ applied to the tip of the CNT field electron emission source is high, thereby improving electric field emission characteristics. Referring to the Fowler-Nordheim plot of FIG. 11, an almost vertical gradient is shown when an electric field is low, and field electron emission characteristics and the field enhancement factor $\beta$ can be obtained from the gradient. The field enhancement factor $\beta$ was 2338 before the taping process and 3337 after the taping process. It can be seen that CNTs lying down before the taping process are vertically aligned after the taping process to increase the field enhancement factor $\beta$ and improve electric field emission characteristics.

Figure 12:
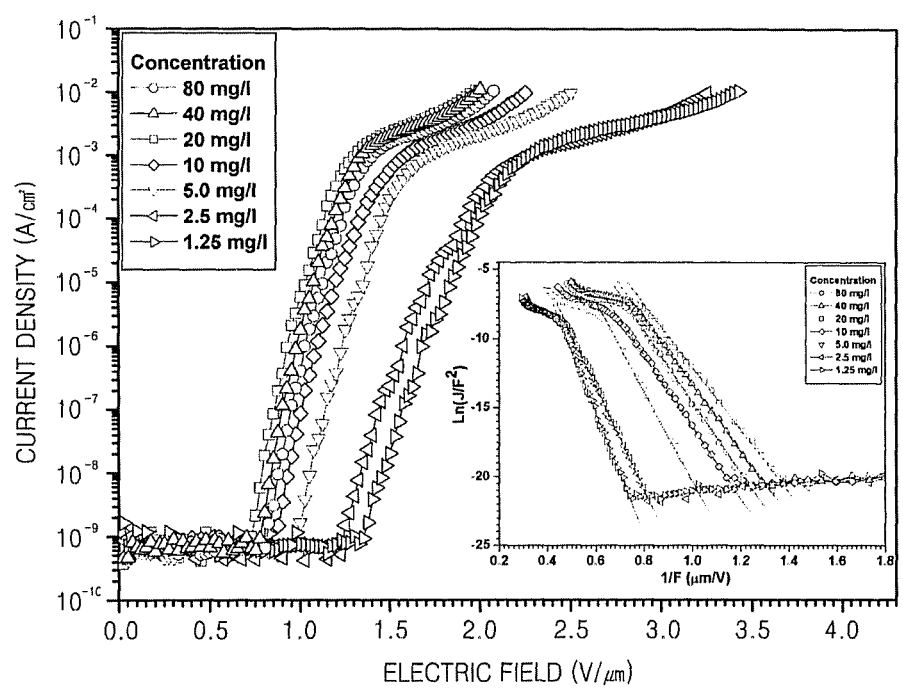
FIG. 12 is a graph illustrating a relationship between current density and electric field after a CNT field electron emission source is subjected to a surface protrusion process when a CNT suspension is at different concentrations.

FIG. 12 is a graph illustrating current density and electric field after a CNT field electron emission source is subjected to a surface protrusion process when a CNT suspension is at different concentrations. After a test was performed on samples having CNT suspensions at concentrations of 1.25, 2.5, 5.0, 10, and 20 mg/l, it is found that a turn-on electric field and a maximum current density are obtained at a low electric field. After a test was performed on samples having CNT suspensions at concentrations of 40 and 80 mg/l, it is found that the intensity of an electric field necessary to obtain a turn-on electric field and a maximum current density is saturated at a level similar to that when the CNT colloidal suspension is at the concentration of 20 mg/l. Accordingly, when the colloidal suspension has a concentration of 20 mg/l, high electric field electron emission characteristics are obtained, and the present invention can easily control optimal CNT field electron emission density. A graph embedded in FIG. 12 is a Fowler-Nordheim plot illustrating a relationship between current density and electric field after a surface protrusion process when a CNT suspension is at different concentrations. After the test was performed on the samples having the CNT suspensions at concentrations of 1.25, 2.5, 5.0, 10, and 20 mg/l, it is found that the field enhancement factor β increases as the concentration increases. After the test was performed on the samples having the CNT suspensions at concentrations of 40 and 80 mg/l, it is found that the field enhancement factor β is saturated at a level similar to that the intermediate CNT colloidal suspension is at the concentration of 20 mg/l. Accordingly, optimal field electron emission density and maximum field emission characteristics can be obtained by controlling the concentration of the CNT suspension.

Figure 13:
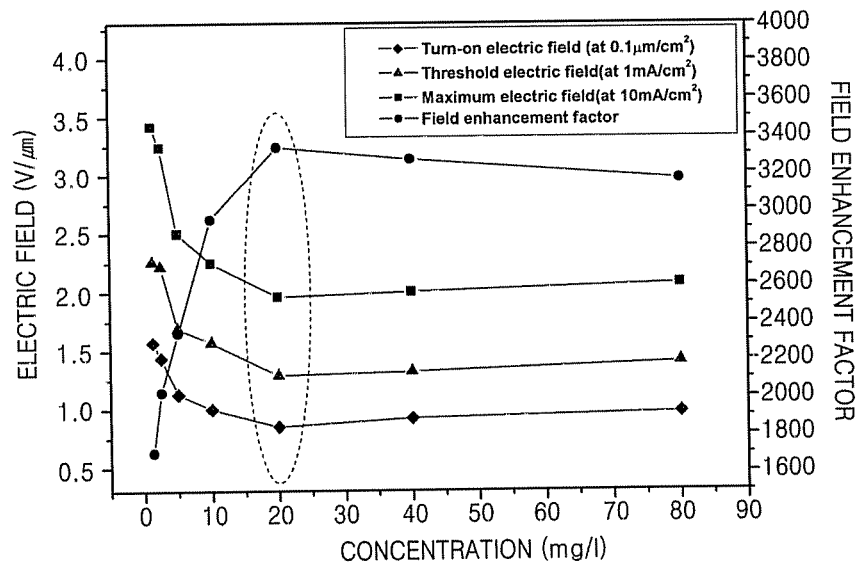
FIG. 13 is a graph illustrating a relationship between field enhancement factor and turn-on electric field, threshold electric field, maximum electric field, and concentration of a CNT colloidal suspension.

FIG. 13 is a graph illustrating a relationship between field enhancement factor β, turn-on electric field, a threshold electric field, maximum electric field, and concentration of a CNT colloidal suspension.

Figure 14A:
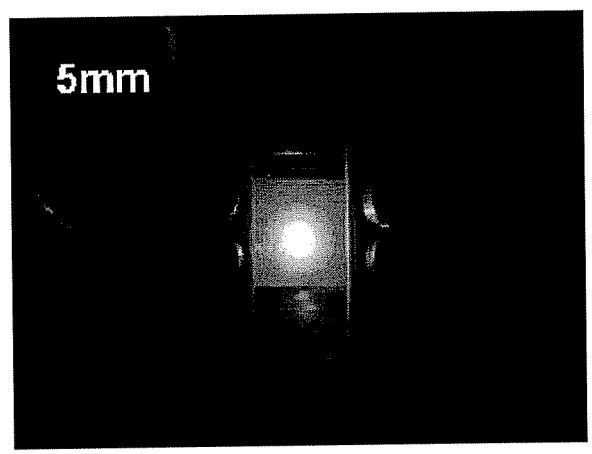
FIGS. 14A, 14B, and 14C are optical photographs illustrating a brightness difference between three samples with different luminous areas manufactured according to the present invention.
Figure 14B:
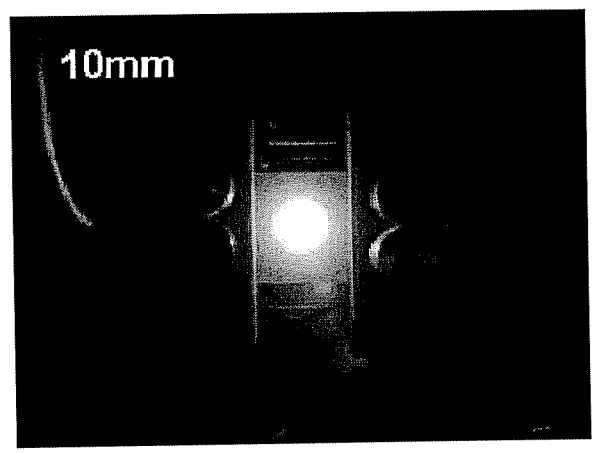
Figure 14C:
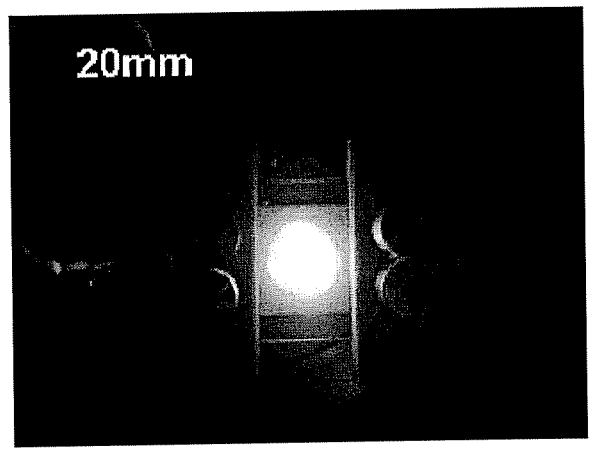

FIGS. 14A, 14B, and 14C are optical photographs illustrating a brightness difference between three samples with different luminous areas manufactured according to the present invention.

CNT layers of FIGS. 14A through 14C had diameters of 5 mm (0.19625 cm$^2$), 10 mm (0.785 cm$^2$), and 20 mm (3.14 cm$^2$), respectively. The electron emission source shown in FIG. 1 was used, an anode formed by coating a phosphor to a transparent glass coated with ITO was used, a distance between the anode and a cathode was 400 μm, a vacuum level was 2×10$^{-7}$ torr, and an applied voltage ranged from 0 V to 3500 V. It can be seen from FIGS. 14A through 14C that very satisfactory luminous efficiency, that is, very uniform brightness, is achieved, and even when a luminous area increases, very high luminous efficiency is achieved.

Figure 15:
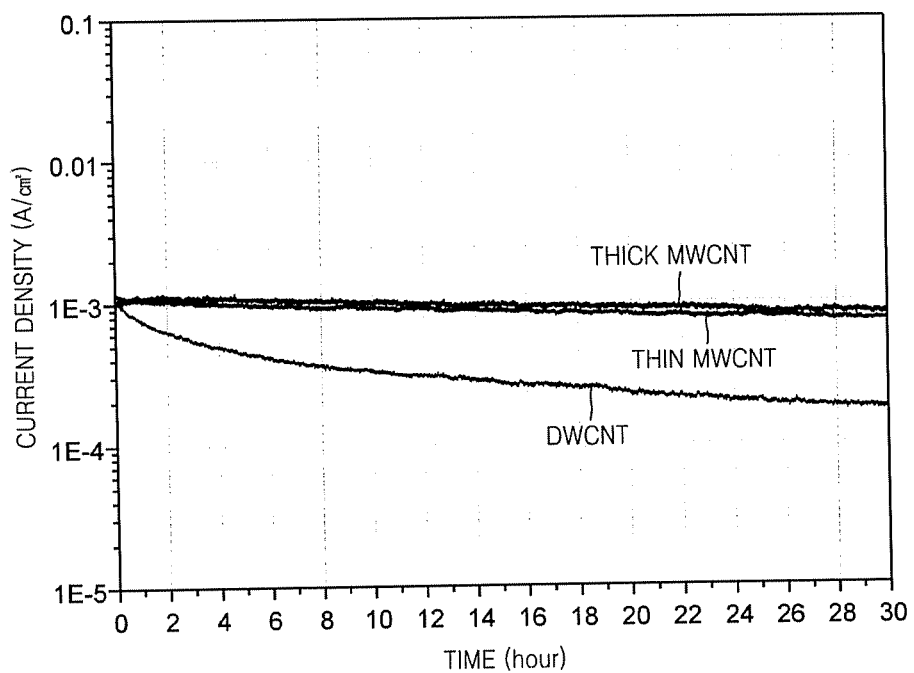
FIG. 15 is a graph illustrating results of an electron emission stability test on different types of CNTs.

FIG. 15 is a graph illustrating results of an electron emission stability test on different types of CNTs. It can be seen from FIG. 15 that MWCNTs are more stable than DWCNTs.

The afore-described single electron emission source may be applied to a display apparatus. In general, display apparatuses have pixels that are electrically addressed in an X-Y matrix, stripe-like cathodes spanning the width of a screen are arranged in parallel, and CNT layers are formed on surfaces of the cathodes to correspond to the pixels.

Figure 16:
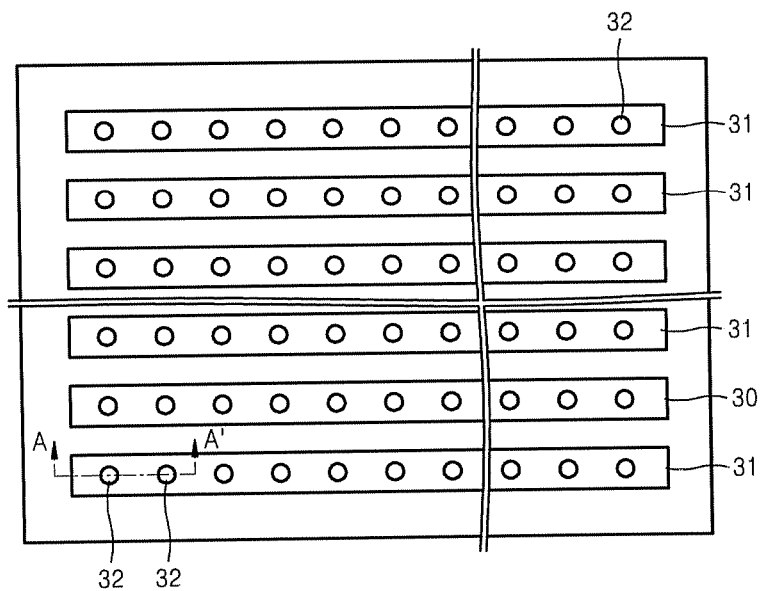
FIG. 16 is a plan view illustrating cathodes of a display apparatus according to an embodiment of the present invention.
Figure 17:
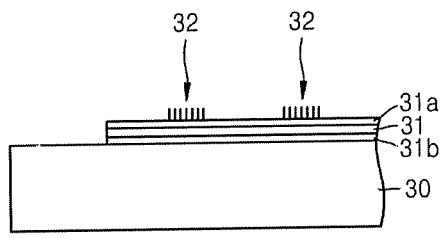
FIG. 17 is a cross-sectional view taken along line A-A' of FIG. 16 according to an embodiment of the present invention.

FIG. 16 is a plan view illustrating cathodes 31 arranged on a substrate 30 of a display apparatus according to an embodiment of the present invention. FIG. 17 is a cross-sectional view taken along line A-A' of FIG. 16 according to an embodiment of the present invention. CNT layers 32 are formed on surfaces of the cathodes 31 at intervals corresponding to pitches of pixels of the display apparatus. The cathodes 31 are formed of a conductive material or a material with an electrical resistance. After separately manufactured, the cathodes 31 are fixed to the substrate 30 by welding or by using adhesive layers 31b. The CNT layers 32 are fixed to top surfaces of the cathodes 31 by using adhesive layers 31a formed under the CNT layers 32. The adhesive layer 31a for fixing the CNT layers 32 to the cathodes 31 may be formed on the entire top surfaces of the cathodes 31 as shown in FIG. 16, or may be formed only under the CNT layers 32.

Figure 18:
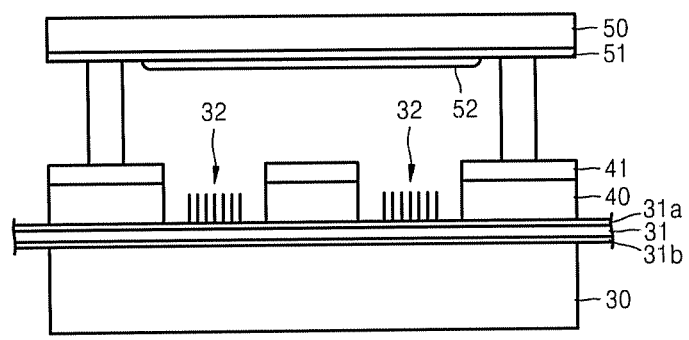
FIG. 18 is a cross-sectional view of a display apparatus according to an embodiment of the present invention.

FIG. 18 is a cross-sectional view of a display apparatus according to an embodiment of the present invention.

Referring to FIG. 18, a cathode 31 is attached to a top surface of a substrate 30, which is a rear plate, by using an adhesive layer 31b. The adhesive layer 31b is an optional element for fixing the cathode 31 to the substrate 30. When the adhesive layer 31b is not used, the cathode 31 may be fixed to the substrate 30 by welding or other adhesion methods as described in the above embodiments. A CNT layer 32 is formed on a top surface of the cathode 31. The CNT layer 32 is fixed to the cathode 31 by using an adhesive layer 31a that is formed under the CNT layer 32. The cathode 31 is separately manufactured from the substrate 30, and then is fixed to the substrate 30 by using the adhesive layer 31a or other means. The CNT layer 32 may be fixed to the cathode 31 in the aforementioned manufacturing method. An insulating layer 40 having a through-hole through which the CNT layer 32 is to be passed is formed on the cathode 31, and a grid 41 for extracting electrons is disposed on the insulating layer 40. A front plate structure is separately manufactured, and then is integrally coupled to the grid 41. The front plate structure includes a front plate 50 and an anode 51 formed on an inner surface of the front plate 50. A phosphor layer 52 is formed on a surface of the anode 51.

The CNT layer 32 disposed on the cathode 31 is manufactured by using a CNT suspension. Since a plurality of CNT layers 32 are disposed on one band-shaped cathode 31, it is necessary to apply a CNT suspension to a plurality of regions of a filter template corresponding to the one cathode 31. To this end, the CNT suspension may be supplied to only the given regions of the cathode 31 by using a printing method or a mask.

Figure 19A:
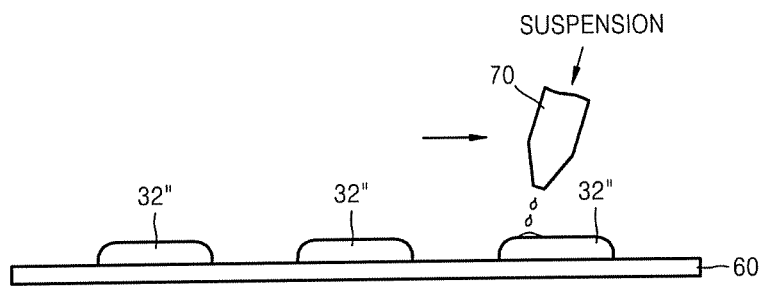
FIG. 19A is a cross-sectional view illustrating a method of manufacturing a cathode of a display apparatus according to an embodiment of the present invention.

FIG. 19A is a cross-sectional view illustrating a method of manufacturing a cathode of a display apparatus according to an embodiment of the present invention. FIG. 19B is a cross-sectional view illustrating a method of manufacturing a cathode of a display apparatus according to another embodiment of the present invention. Referring to FIG. 19A, a CNT suspension is supplied to a band-shaped filter template 60 through a nozzle. The CNT suspension is dried, and then is transferred, to obtain a cathode 31 having CNT layers 32 as shown in FIGS. 16, 17, and 18. Alternatively, a suspension may be supplied at one time as shown in FIG. 19B. Referring to FIG. 19B, a mask 80 having through-holes corresponding to CNT layers is placed over a filter template 60 and then a CNT suspension 32" is supplied. Accordingly, the CNT suspension 32" can be supplied to given regions of the filter template 60 in a short time. In this case, since the CNT suspension 32" is in contact with the mask 80, when the mask 80 is separated from the filter template 60 before the CNT suspension 32" is dried, the CNT suspension 32" is stuck a little to the mask 80, thereby failing to form complete CNT layers on the filter template 60. Accordingly, it is preferable that after the CNT suspension 32" is properly or completely dried, the mask 80 should be separated from the filter template 60. The plurality of CNT layers are formed on the filter template 60 in this way, and then are transferred to the cathode.

Accordingly, a CNT thin film formed by using a suspension filtering method can be easily transferred by using a conductive tape with strong adhesion. Since adhesion between the CNT thin film and the conductive tape is very high, field electron emission characteristics of the CNT thin film can be improved by a simple taping process. Stable and reliable electric field electron emission characteristics can be obtained without attaching or detaching the CNT thin film during electric field electron emission even at a high electric field. The active electron emission site density of the CNT thin film can be easily controlled by controlling the concentration of an evenly dispersed CNT colloidal suspension. Also, a large CNT thin film with uniform characteristics can be easily manufactured by using this method, and thus a large CNT field electron emission source can be manufactured.

As described above, according to the present invention, a CNT layer having an optimal concentration for electric field electron emission is formed by preparing an evenly dispersed CNT colloidal suspension by using any of various types of needle-shaped electron emission materials, that is, nanotubes or nanorods having a predetermined length, for example, CNT powder, through a suspension filtering method, supplying the suspension onto a filter template having pores, filtering the suspension through the filter template, and drying the suspension. Since CNTs are very uniformly dispersed in the suspension, the CNT layer formed on the filter template can have uniform CNTs. Since the CNT layer is transferred to a cathode on which an adhesive layer is formed, the CNT layer can be stably fixed to the cathode. Since the CNT layer is subjected to a subsequent taping process such that the CNTs are vertically erected to the cathode, the number of CNTs contributing to electron emission can be drastically increased. Since the CNT layer can be formed on the cathode at low temperature or room temperature, not at high temperature, problems that a conventional high temperature process encounters can be avoided. Accordingly, the electron emission source according to the present invention can be structurally very stable and can ensure high and uniform electron emission.

Since the electron emission source according to the present invention can be simply manufactured at room temperature without a complicated process without using paste including conductive organic/inorganic matters, binders, and polymers which badly affect field electron emission characteristics, a large electron emission source can be manufactured. In particular, since a large electron emission area can be easily obtained, a display apparatus can have one CNT layer at one pixel.

Since the CNT layer is formed by using the suspension, the concentration of the CNT layer can be easily controlled by controlling the concentration of the CNTs, and accordingly, optimal field electron emission source density can be obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electron emission source comprising:
   a conductive plate-shaped cathode;
   a needle-shaped electron emission material layer formed on a surface of the conductive plate-shaped cathode;
   a conductive tape interposed between the needle-shaped electron emission material layer and the conductive plate-shaped cathode;
   a base supporting the conductive plate-shaped cathode; and
   a fixing element fixing the conductive plate-shaped cathode to the base.

2. The electron emission source of claim 1, wherein the cathode has an adjusted electrical resistance such that current is uniformly supplied to the needle-shaped electron emission material layer formed on a surface of the cathode.

3. The electron emission source of claim 1, wherein an adhesive layer is formed on a side surface of the conductive plate-shaped cathode.

4. The electron emission source of claim 1, wherein the conductive plate-shaped cathode is welded to the base.

5. The electron emission source of claim 1, wherein a protrusion corresponding in shape to the needle-shaped electron emission material layer is formed on the base, and the fixing element is a fixing member that presses an edge of the conductive plate-shaped cathode onto the protrusion.

6. The electron emission source of claim 5, wherein the fixing element and the base are complementarily engaged with each other.

7. A display apparatus comprising:
   a conductive plate-shaped cathode;
   a needle-shaped electron emission material layer formed on a surface of the conductive plate-shaped cathode;
   a conductive tape interposed between the needle-shaped electron emission material layer and the conductive plate-shaped cathode;
   a base supporting the conductive plate-shaped cathode;
   a fixing element fixing the conductive plate-shaped cathode to the base;
   a front plate spaced apart from the base;
   an anode formed on an inner surface of the front plate facing the electron emission material layers;
   a phosphor layer formed on a surface of the anode; and
   a grid disposed between the cathode and the phosphor layer and extracting electrons from the electron emission material layers.

8. The electron emission source of claim 1, further comprising an adhesive layer for fixing the electron emission material layer to said conductive tape interposed between the electron emission material layer and the conductive tape.

9. The electron emission source of claim 1, wherein the fixing element is any one of a fixing member, an adhesive, and a welding portion, which mechanically fix the conductive tape to the base.

* * * * *